United States Patent
Aoki et al.

(10) Patent No.: US 12,307,708 B2
(45) Date of Patent: May 20, 2025

(54) VEHICLE CONTROL DEVICE

(71) Applicant: TOYOTA JIDOSHA KABUSHIKI KAISHA, Toyota (JP)

(72) Inventors: Takayuki Aoki, Toyota (JP); Daisuke Itagaki, Kasugai (JP); Ryusuke Ohta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/393,992

(22) Filed: Dec. 22, 2023

(65) Prior Publication Data

US 2024/0296581 A1  Sep. 5, 2024

(30) Foreign Application Priority Data

Mar. 3, 2023 (JP) ................. 2023-032803

(51) Int. Cl.
| | |
|---|---|
| G02B 27/01 | (2006.01) |
| G06T 7/73 | (2017.01) |
| G06V 10/40 | (2022.01) |
| G06V 10/764 | (2022.01) |
| G06V 20/59 | (2022.01) |
| G09G 3/00 | (2006.01) |

(52) U.S. Cl.
CPC ............ *G06T 7/73* (2017.01); *G02B 27/0172* (2013.01); *G06V 10/40* (2022.01); *G06V 10/764* (2022.01); *G06V 20/59* (2022.01); *G09G 3/001* (2013.01); *G02B 2027/0141* (2013.01); *G02B 2027/0178* (2013.01); *G06T 2207/30268* (2013.01); *G09G 2340/0464* (2013.01)

(58) Field of Classification Search
CPC . G06T 7/73; G06T 2207/30268; G06V 20/59; G06V 10/40; G06V 10/764; G02B 27/0172; G02B 2027/0141; G02B 2027/0178; G09G 3/001; G09G 2340/0464
See application file for complete search history.

(56) References Cited

U.S. PATENT DOCUMENTS

| | | | | |
|---|---|---|---|---|
| 2014/0149255 | A1* | 5/2014 | Bouma | G06Q 30/0623 705/26.61 |
| 2015/0283902 | A1* | 10/2015 | Tuukkanen | G06V 20/597 340/461 |
| 2015/0378157 | A1* | 12/2015 | Kuehne | G06F 3/011 345/8 |
| 2019/0220238 | A1* | 7/2019 | Amano | B60K 35/00 |
| 2024/0017976 | A1* | 1/2024 | Parlaktuna | B66F 17/003 |

FOREIGN PATENT DOCUMENTS

JP  2019-125188 A  7/2019

\* cited by examiner

*Primary Examiner* — Robert J Michaud
(74) *Attorney, Agent, or Firm* — SoraIP, Inc.

(57) ABSTRACT

The storage unit stores first feature point information of the AR glasses obtained by photographing the AR glasses with a camera (tracking camera or camera) and extracting features. Further, the specifying unit combines second feature point information obtained by photographing the AR glasses brought into the car with a tracking camera and extracting features with the first feature point information stored in the storage unit. The position of the AR glasses brought into the vehicle is determined based on the verification results.

5 Claims, 4 Drawing Sheets

VEHICLE CONTROL DEVICE

CROSS-REFERENCE TO RELATED APPLICATION

This application claims priority to Japanese Patent Application No. 2023-032803 filed on Mar. 3, 2023 incorporated herein by reference in its entirety.

BACKGROUND

1. Technical Field

The present disclosure relates to a vehicle control device.

2. Description of Related Art

Japanese Unexamined Patent Application Publication No. 2019-125188 (JP 2019-125188 A) discloses wearable terminal augmented reality (AR) glasses that are worn on the head of an occupant and are equipped with a display unit that is placed in front of the occupant in a worn state.

SUMMARY

In order to display contents on the display unit of the AR glasses so that the contents such as arrows are superimposed at any position on the scenery outside a vehicle that the user views through the AR glasses, it is necessary to specify the relative relationship between the vehicle and the AR glasses (the position of the AR glasses inside the vehicle). The relative position between the vehicle and the AR glasses is generally determined by attaching a tracking rig or marker to the AR glasses and detecting the attached rig or marker with an infrared sensor or the like. However, when a rig or a marker is attached to the AR glasses, there is a problem in that the weight of the AR glasses increases or the weight balance is lost, which impairs the feeling of wearing the AR glasses.

The present disclosure has been made in consideration of the above facts, and an object of the present disclosure is to obtain a vehicle control device that can specify the position of AR glasses without attaching a rig or marker to the AR glasses.

A vehicle control device according to a first aspect includes a storage unit that stores first feature information of AR glasses obtained by detecting the AR glasses with a sensor and extracting a feature; and
a specifying unit that checks second feature information obtained by detecting the AR glasses brought into a vehicle with the sensor and extracting the feature against the first feature information stored in the storage unit, and based on a check result, specifies a position in the vehicle of the AR glasses brought into the vehicle.

In the first aspect, the first feature information obtained by detecting AR glasses with the sensor and extracting the feature is stored, and the stored first feature information is checked against the second information of the AR glasses brought into the vehicle. Therefore, it is possible to improve the recognition rate of the AR glasses when identifying the position of the AR glasses using the second feature information. This makes it possible to specify the position of the AR glasses without attaching a rig or marker to the AR glasses.

In a second aspect, in the first aspect, each of the first feature information and the second feature information is information that includes a plurality of feature points including feature points located at a boundary between a lens and a frame of the AR glasses.

For example, in an aspect in which the sensor is a camera that detects the AR glasses as an image, the boundary between the lens and the frame of the AR glasses is an edge that differs greatly in a predetermined feature amount (for example, brightness, hue, and the like) in a result of the detection of the AR glasses by the sensor. By utilizing this, in the second aspect, since each of the first feature information and the second feature information includes information of feature points located at the boundary between the lens and the frame of the AR glasses, it is possible to specify the position of the AR glasses without attaching a rig or marker to the AR glasses.

In a third aspect, in the first aspect, the specifying unit generates the first feature information of the AR glasses to be stored in the storage unit or the second feature information of the AR glasses using a mapping algorithm in a simultaneous localization and mapping (SLAM) technology, and checks the first feature information against the second feature information using a localization algorism in the SLAM technology.

In the third aspect, using the algorithms of the existing SLAM technology, the specifying unit generates the first feature information or the second feature information of the AR glasses and check the first feature information against the second feature information. This makes it possible to configure the specifying unit, and reduce the development cost of the vehicle control device according to the present disclosure.

In a fourth aspect, in the first aspect, the storage unit stores the first feature information of each of a plurality of kinds of the AR glasses; and
the specifying unit checks the second feature information that is obtained by detecting the AR glasses brought into the vehicle with the sensor and extracting the feature against the first feature information of each of the plurality of kinds of the AR glasses stored in the storage unit, and specifies a type of the AR glasses brought into the vehicle.

In the fourth aspect, the first feature information of each of the plurality of kinds of the AR glasses is stored, the second feature information of the AR glasses brought into the vehicle is checked against the first feature information of each of the plurality of kinds of AR glasses, and the type of the AR glasses brought into the vehicle is specified. Accordingly, even when it is unclear which AR glasses out of a plurality of kinds of AR glasses are brought into the vehicle, it is possible to specify the kind of the AR glasses brought into the vehicle, and specify the position in the vehicle of the AR glasses brought into the vehicle with high accuracy.

In a fifth aspect, in the first aspect, the vehicle control device further includes a display control unit that causes a content to be displayed in a position corresponding to a predetermined position in a display unit provided in the AR glasses such that, based on the position in the vehicle of the AR glasses brought into the vehicle, the position being specified by the specifying unit, the content is superimposed at the predetermined position on scenery outside the vehicle that is viewed through the AR glasses.

According to the fifth aspect, it is possible to superimpose the content to be displayed on the display unit of the AR glasses at any position on the scenery outside the vehicle that is viewed through the AR glasses.

The present disclosure has an effect that it becomes possible to specify the position of AR glasses without attaching a rig or marker to the AR glasses.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
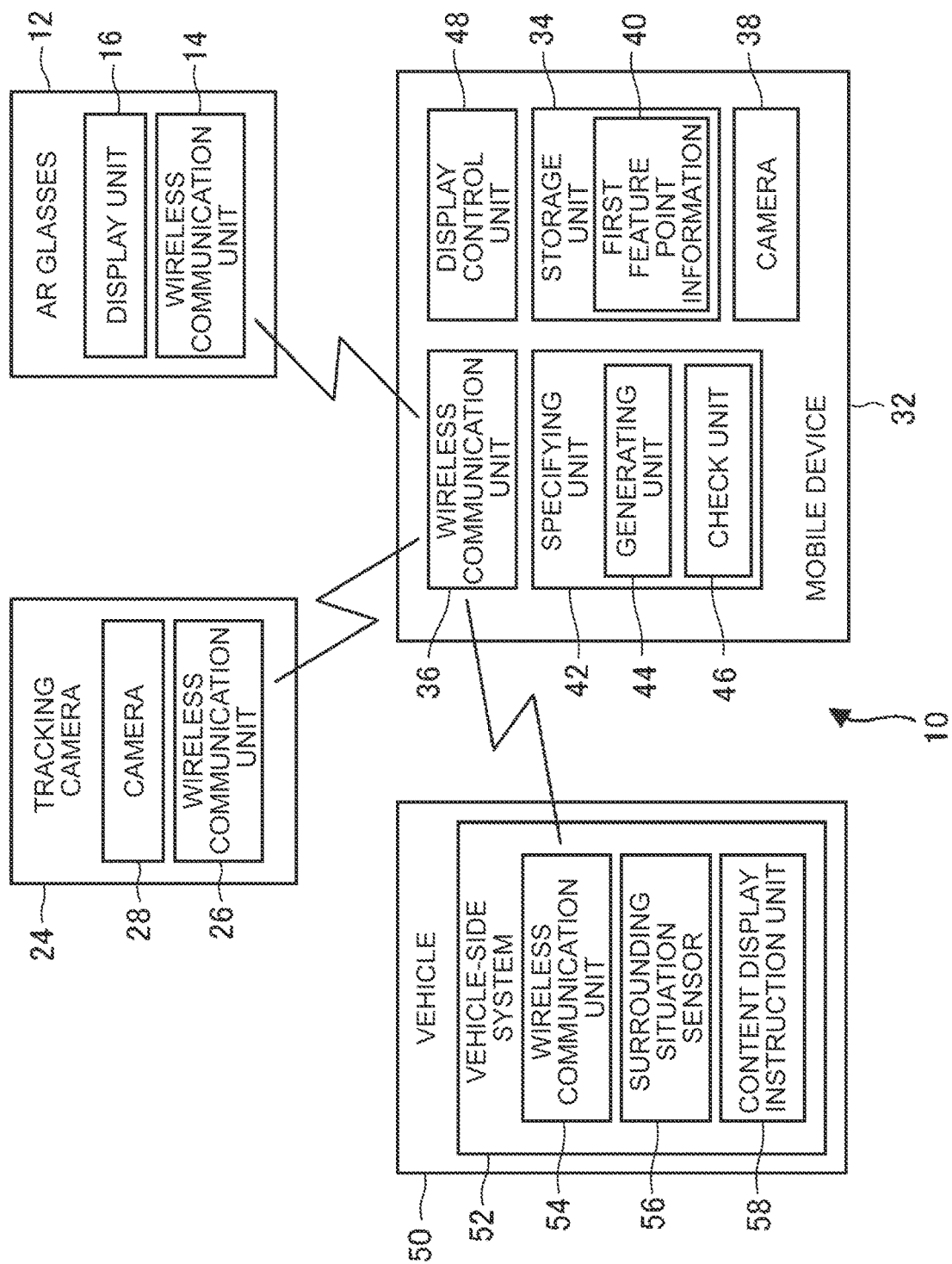
FIG. 1 is a block diagram showing a schematic configuration of a vehicle control system according to an embodiment.

Hereinafter, an example of an embodiment of the present disclosure will be described in detail with reference to the drawings. FIG. 1 shows a vehicle control system 10 according to an embodiment. The vehicle control system 10 includes AR glasses 12 worn on the user's head, a tracking camera 24, a mobile terminal 32 such as a smartphone or a tablet terminal carried by the user, and a vehicle-side system 52 mounted on a vehicle 50.

Figure 2:
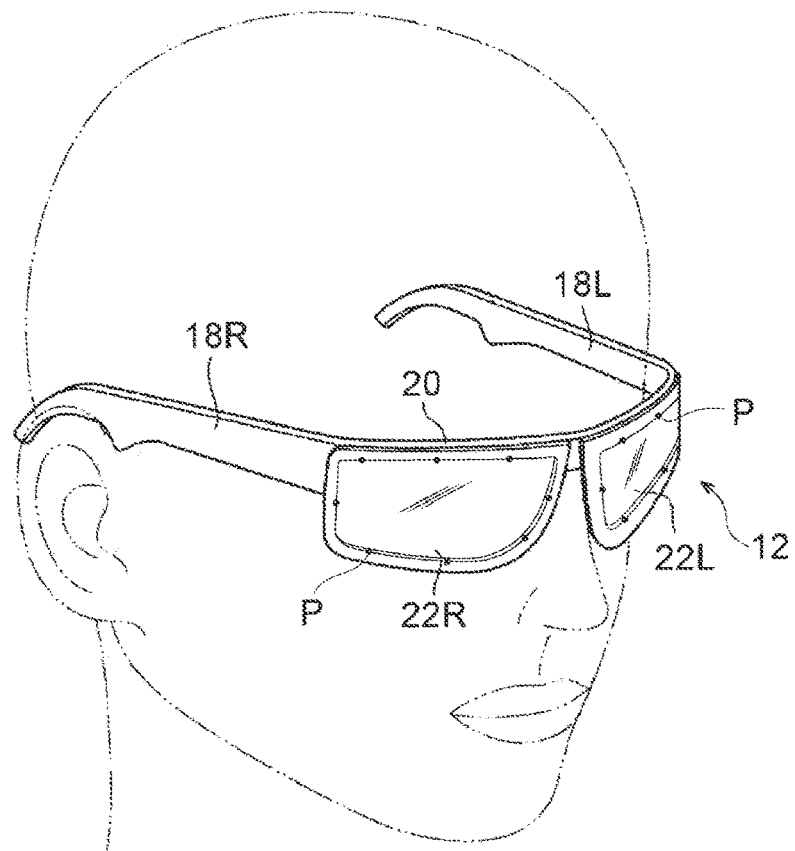
FIG. 2 is a perspective view showing an example of AR glasses.

The AR glasses 12 include a wireless communication section 14 that performs wireless communication with a mobile terminal 32, etc., and a display unit 16. As shown in FIG. 2, in the AR glasses 12, left and right glass units 22L and 22R having light transmittance are attached to a frame 20 to which the bases of left and right temples 18L and 18R are attached. A display unit 16 capable of displaying an image is provided on the inner surface of the glass units 22L and 22R (the surface facing the eyes of the user wearing the AR glasses 12).

The display unit 16 is of a see-through type and is configured such that light incident on the glass units 22L, 22R from the outer surfaces of the glass units 22L, 22R is transmitted through the display unit 16 and is incident on the eyes of the occupant wearing the AR glasses 12. As a result, when an image is displayed on the display unit 16, the occupant wearing the AR glasses 12 visually recognizes the image (virtual image) that is displayed on the display unit 16 and is superimposed in the real field of view (for example, the real image in front of the vehicle 50) through the glass units 22L and 22R.

Figure 3:
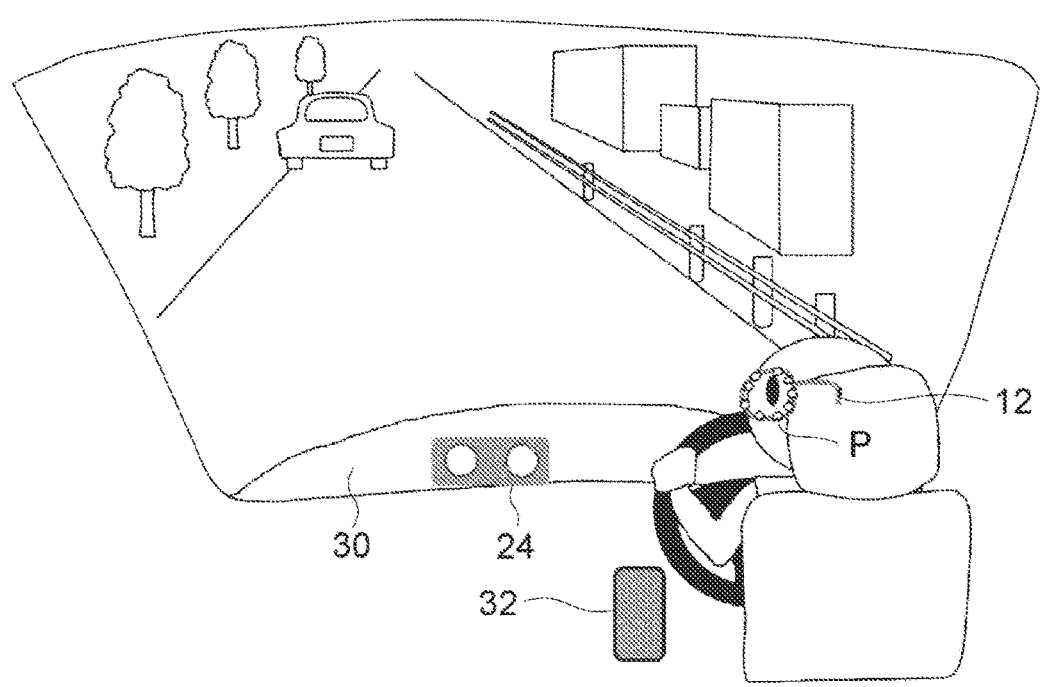
FIG. 3 is a perspective view showing a user wearing AR glasses sitting in a vehicle seat.

The tracking camera 24 includes a wireless communication unit 26 that performs wireless communication with the mobile terminal 32 and the like, and a camera 28 that photographs the AR glasses 12 and the like. The tracking camera 24 is arranged on an instrument panel 30 or the like in the vehicle cabin of the vehicle 50, as also shown in FIG. 3. However, the tracking camera 24 may be fixedly installed on the vehicle 50 or may be taken out of the vehicle 50.

The mobile terminal 32 includes a Central Processing Unit (CPU), memory such as Read Only Memory (ROM) and Random Access Memory (RAM), and a non-volatile storage unit 34 such as a Hard Disk Drive (HDD) and Solid State Drive (SSD), a wireless communication section 36, and a camera 38. A control program is stored in the storage unit 34, and a storage area 40 of first feature point information obtained by photographing the AR glasses 12 with a camera (tracking camera 24 or camera 38) and extracting features is provided in the storage unit 34. Note that first feature point information of a plurality of types of AR glasses 12 can be registered in the storage area 40. The mobile terminal 32 functions as a specifying unit 42 and a display control unit 48 by the CPU executing a control program, and performs an information registration process (FIG. 4) and a display control process (FIG. 5), which will be described later.

The specifying unit 42 checks the second feature information of the AR glasses 12 obtained by detecting the AR glasses 12 brought into the vehicle 50 with the tracking camera 24 and extracting the features against the first feature point information of the AR glasses 12 stored in the storage unit 34, and the position of the AR glasses 12 brought into the vehicle 50 is specified based on the check result.

Further, the specifying unit 42 specifically includes a generating unit 44 and a check unit 46. The generating unit 44 generates first feature point information of the AR glasses 12 or second feature point information of the AR glasses 12 from the photographed image of the AR glasses 12 using an algorithm for creating an environment map in the SLAM technology. The check unit 46 also checks the first feature point information of the AR glasses 12 and the second feature point information of the AR glasses 12 using a self-position estimation algorithm in the SLAM technology.

The display control unit 48 displays predetermined content for the scenery outside the vehicle that is visually recognized through the AR glasses 12 based on the position in the vehicle of the AR glasses 12 brought into the vehicle, which is specified by the specifying unit 42. The content is displayed on the display unit 16 of the AR glasses 12 at a position corresponding to the predetermined position so as to be superimposed on the position (the position instructed by the vehicle-side system 52). Note that the storage unit 34 is an example of a storage unit according to the present disclosure, and in the mode shown in FIG. 1, the mobile terminal 32 functions as an example of a vehicle control device according to the present disclosure.

The vehicle-side system 52 includes a plurality of electronic control units (ECUs) (not shown), a wireless communication unit 54 that performs wireless communication with the mobile terminal 32, and a peripheral system that detects the state of the surrounding environment of the vehicle 50. A surrounding situation sensor 56 is included.

As the surrounding situation sensor 56, for example, at least one of a camera, a radar, Light Detection And Ranging (LiDAR), or Laser Imaging Detection And Ranging (LiDAR) is applied. The detection result of the surrounding environment by the surrounding situation sensor 56 is used in the process of specifying the position of the vehicle 50 with respect to the outside of the vehicle using SLAM technology. This process is performed by the first ECU of the vehicle-side system 52, and the position of the vehicle 50 with respect to the outside of the vehicle obtained through the process is periodically transmitted to the mobile terminal 32 via the wireless communication unit 54.

Further, the second ECU of the vehicle-side system 52 functions as a content display instruction unit 58. The content display instruction unit 58 monitors whether the timing to display content on the display unit 16 of the AR glasses 12 has arrived, and when it is determined that the timing has arrived, the content display instruction unit 58 transmits content information including the type, three-dimensional position, etc. of the content to be displayed on the display unit 16 of the AR glasses 12 to the mobile terminal 32 via the wireless communication unit 54.

As an example, by checking information about the planned travel route of the vehicle 50 obtained from a navigation device mounted on the vehicle 50 against the current position of the vehicle that is obtained from a Global Navigation Satellite System (GNSS) sensor mounted on the vehicle 50, the content display instruction unit 58 monitors whether or not the vehicle 50 is approaching a turning point. If it is determined that the vehicle 50 is about to make a turn, the content display instruction unit 58 sends content information to the mobile terminal 32 instructing to display an arrow indicating the turning direction of the vehicle superimposed on the road at the turning destination.

Figure 4:
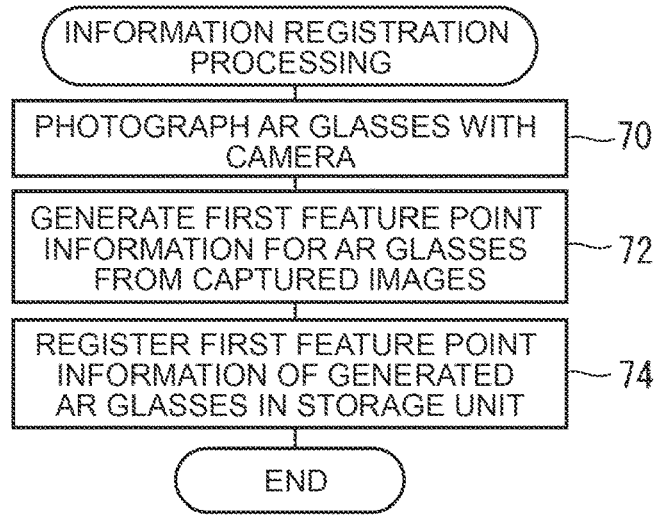
FIG. 4 is a flowchart showing an example of information registration processing.
Figure 5:
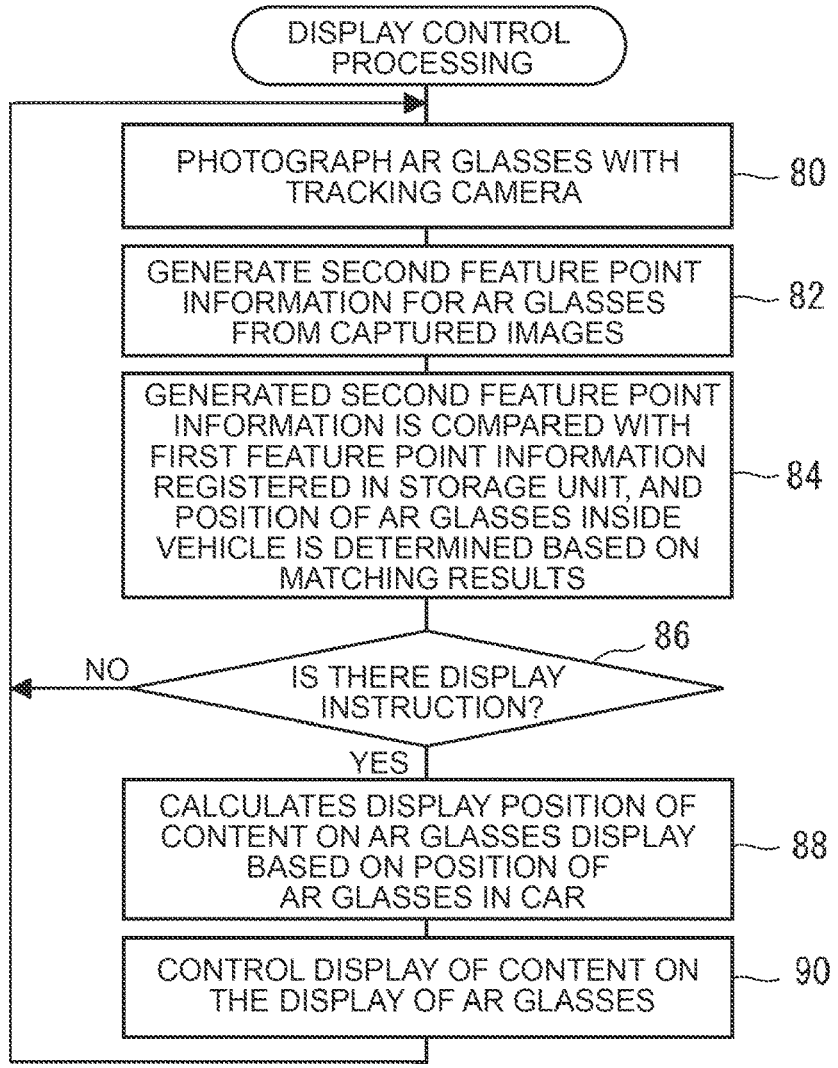
FIG. 5 is a flowchart showing an example of display control processing.

Next, as an operation of this embodiment, an information registration process performed by the mobile terminal 32 when the user instructs the mobile terminal 32 to register information about the AR glasses 12 will be described first with reference to FIG. 4. Note that the location where the information registration process is performed may be inside the vehicle 50 or outside the vehicle 50 (for example, the user's home).

In step 70, the specifying unit 42 of the mobile terminal 32 causes a camera (tracking camera 24 or camera 38 of the mobile terminal 32) to photograph the AR glasses 12, and acquires a photographed image of the AR glasses 12 obtained by the photographing from the camera.

In step 72, the generating unit 44 extracts feature points of the AR glasses 12 from the photographed image of the AR glasses 12 obtained in step 70 using an algorithm for creating an environmental map in SLAM technology, and generates first feature point information. Examples of feature points extracted from the AR glasses 12 are shown in FIGS. 2 and 3 with the symbol "P" attached thereto. As shown in FIGS. 2 and 3, the feature points extracted as the first feature point information include feature points located at the boundaries between the glass units 22L and 22R of the AR glasses 12 and the frame 20. Note that the first feature point information is an example of first feature information in the present disclosure.

Further, in step 74, the specifying unit 42 registers the first feature point information of the AR glasses 12 generated in step 72 in the storage area 40 of the storage unit 34, and ends the information registration process. In this embodiment, by performing the information registration process shown in FIG. 4 for each of the plurality of types of AR glasses 12, it is also possible that the first feature point information of each of the types of the AR glasses 12 is stored in the storage area 40 of the storage unit 34.

Next, with reference to FIG. 4, the display control process performed by the mobile terminal 32 in a situation where the user who gets into the vehicle 50 and sits on the seat wears the AR glasses 12 brought into the vehicle (see FIG. 3) will be described. Note that this display control processing may be triggered by, for example, inputting a predetermined instruction into the mobile terminal 32 by the user, or the display control process may be activated when the mobile terminal 32 is capable of wireless communication with the vehicle-side system 52. It may be configured to be automatically activated using the state as a trigger.

In step 80, the specifying unit 42 of the mobile terminal 32 causes the tracking camera 24 to photograph the AR glasses 12 that the user is wearing, and acquires from the tracking camera 24 a photographed image of the AR glasses 12 obtained by the photographing. In addition, in step 82, the generating unit 44 extracts feature points of the AR glasses 12 from the captured image of the AR glasses 12 acquired in step 80 using an algorithm for creating an environmental map in the SLAM technology, and generates second feature point information.

In step 84, the check unit 46 checks the self-position estimation algorithm in the SLAM technology to combine the first feature point information of the AR glasses 12 stored in the storage unit 34 against the second feature point information of the AR glasses 12 generated in step 82. The position of the AR glasses 12 in the vehicle 50 is specified based on the check result.

Note that when the first feature point information of multiple types of AR glasses 12 is stored in the storage area 40 of the storage unit 34, and step 84 is executed for the first time, the check unit 46 checks the second feature point information of the AR glasses 12 against the first feature point information of each of the plurality of types of AR glasses 12 stored in the storage unit 34. The check unit 46 then identifies the type of AR glasses 12 based on the degree of matching in feature point information check, and when executing step 84 for the second time or later, using the first feature point information that corresponds to the identified type of AR glasses 12, the check unit 46 performs the feature point information check and specifies the position of the AR glasses 12.

In step 86, the display control unit 48 determines whether the content display instruction unit 58 of the vehicle-side system 52 has instructed the AR glasses 12 to display the content. If the determination at step 86 is negative, the process returns to step 80 and the processes from steps 80 to 84 are repeated. If content information is received from the content display instruction unit 58, the determination in step 86 is affirmative and the process moves to step 88.

In step 88, the display control unit 48 controls the AR glasses 12 to superimpose the content on the real image that the user views through the AR glasses 12 at a three-dimensional position indicated by the content information received from the vehicle-side system 52. The display position of the content on the display unit 16 is calculated. This calculation of the display position is performed based on the position of the AR glasses 12 inside the vehicle specified in the previous step 84 and the position of the vehicle 50 relative to the outside of the vehicle received from the vehicle-side system 52.

In step 90, the display control unit 48 controls the AR glasses 12 so that the content is displayed at the display position calculated in step 88 on the display unit 16 of the AR glasses 12. As a result, the content (virtual image) displayed on the display unit 16 of the AR glasses 12 is visually perceived as being superimposed on the real image that the user sees through the AR glasses 12 at the three-dimensional position indicated by the content information. After the process of step 90 is performed, the process returns to step 80 and the process from step 80 onward is repeated.

As explained above, in this embodiment, the storage unit 34 stores the first feature point information of the AR glasses 12 obtained by photographing the AR glasses 12 with a camera (tracking camera 24 or camera 38) and extracting the features. The specifying unit 42 also uses the second feature point information obtained by photographing the AR glasses 12 brought into the car with the tracking camera 24 and extracting the features from the first feature point information stored in the storage unit 34. The AR glasses 12 are compared with the feature point information, and the position of the AR glasses 12 brought into the vehicle is specified based on the comparison result. This makes it possible to specify the position of the AR glasses 12 without attaching a rig or marker to the AR glasses 12.

Further, in the present embodiment, the first feature point information and the second feature point information are information on a plurality of feature points including feature points located at the boundaries between the glass units 22L, 22R and the frame 20 in the AR glasses 12. Thereby, the position of the AR glasses 12 can be specified without attaching a rig or marker to the AR glasses 12.

Further, in the present embodiment, the specifying unit 42 generates first feature point information of the AR glasses 12 or second feature point information of the AR glasses 12 to be stored in the storage unit 34 using an algorithm for creating an environment map in the SLAM technology. Then, the first feature point information and the second feature point information are compared using a self-position estimation algorithm in the SLAM technology. Thereby, the specifying unit 42 can be easily configured, and the cost for developing a control program for causing the mobile terminal 32 to function as a vehicle control device according to the present disclosure can be reduced.

In the present embodiment, the storage unit 34 stores first feature point information for each of the plurality of types of AR glasses 12, and the specifying unit 42 photographs the AR glasses 12 brought into the car with the tracking camera 24. By comparing the second feature point information obtained by extracting the features with the first feature information of the plurality of types of AR glasses 12 stored in the storage unit 34, the types of the AR glasses 12 brought into the car are identified. As a result, even if it is unclear which AR glass 12 out of multiple types of AR glasses 12 is brought into the car, the type of AR glass 12 brought into the car can be identified and the type of AR glass 12 brought into the car can be determined. The position of the AR glasses 12 in the vehicle can be specified with high accuracy.

Further, in the present embodiment, the display control unit 48 controls the view of the scenery outside the vehicle that is visually recognized through the AR glasses 12 based on the position in the vehicle of the AR glasses 12 brought into the vehicle, which is specified by the specifying unit 42. The content is displayed at a position corresponding to the predetermined position on the display unit 16 provided on the AR glasses 12 so that the content is superimposed on the predetermined position. Thereby, the content to be displayed on the display unit 16 of the AR glasses 12 can be superimposed at any position on the scenery outside the vehicle that is visually recognized through the AR glasses 12.

Note that in the embodiments described above, the tracking camera 24 that detects the AR glasses 12 as an image or the camera 38 of the mobile terminal 32 is applied as an example of a sensor in the present disclosure. However, the sensor in the present disclosure may be, for example, LiDAR or a distance image sensor.

Further, in the above embodiment, the first feature point information of the AR glasses 12 is registered in the storage unit 34 of the mobile terminal 32 by performing the information registration process (FIG. 4) on the mobile terminal 32. However, the present disclosure is not limited thereto. For example, first feature point information is obtained by performing a process similar to the above information registration process on the AR glasses 12 in advance, and the first feature point information is used to install a control program on the mobile terminal 32. It may be configured such that the information is registered in the storage unit 34 at the same time.

Figure 6:
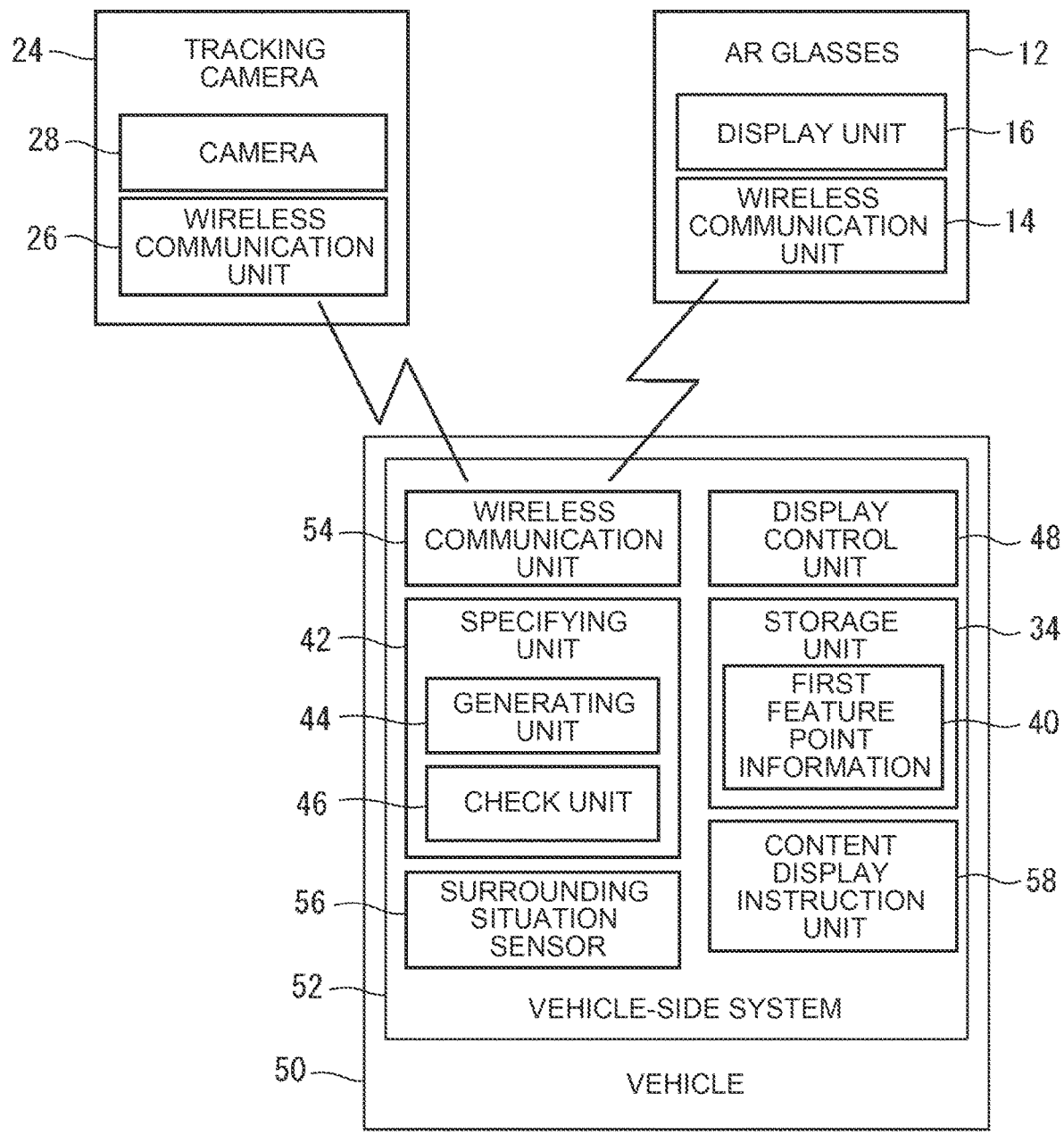
FIG. 6 is a block diagram showing another schematic configuration of the vehicle control system.

Further, in the above embodiment, a mode has been described in which the mobile terminal 32 functions as an example of the vehicle control device according to the present disclosure, but the present disclosure is not limited to this. As an example, as shown in FIG. 6, any ECU included in the vehicle-side system 52 may function as an example of the vehicle control device according to the present disclosure. In this case, as shown in FIG. 6, the ECU may be configured to communicate directly with the AR glasses 12 and the tracking camera 24, thereby omitting the mobile terminal 32.

What is claimed is:

1. A vehicle control device comprising:
   a memory that stores first feature information of augmented reality glasses, the first feature information including a plurality of first feature points located at a boundary between a lens and a frame of the augmented reality glasses, and the first feature information being obtained by detecting the augmented reality glasses with a sensor and extracting the plurality of first feature points; and
   a processor configured to
   capture an image of the augmented reality glasses brought into a vehicle with a camera,
   extract a plurality of second feature points from the captured image and obtain second feature information of the augmented reality glasses brought into the vehicle, the second feature information including the plurality of second feature points located at the boundary between the lens and the frame of the augmented reality glasses brought into the vehicle,
   compare the second feature information with the first feature information and find the second feature points corresponding to the first feature points,
   calculate a display position to display content based on positions of the second feature points corresponding to the first feature points, the display position being located in a display unit of the augmented reality glasses brought into the vehicle, and
   display the content in the display position.

2. The vehicle control device according to claim 1, wherein
   the processor is configured to:
   generate the first feature information of the augmented reality glasses to be stored in the memory or the second feature information of the augmented reality glasses using a mapping algorithm in a simultaneous localization and mapping technology; and
   compare the second feature information with the first feature information using a localization algorism in the simultaneous localization and mapping technology.

3. The vehicle control device according to claim 1, wherein:
   the memory stores the first feature information of each of a plurality of types of the augmented reality glasses; and
   the processor is configured to
   check the second feature information against the first feature information of each of the plurality of types of the augmented reality glasses, and
   based on the checking result, specify a type of the augmented reality glasses brought into the vehicle, wherein
   in the comparison of the second feature information with the first feature information, the processor compares the second feature information with the first feature information that corresponds to the specified type of the augmented reality glasses brought into the vehicle.

4. The vehicle control device according to claim 1, wherein the content is superimposed at the display position on scenery outside the vehicle that is viewed through the augmented reality glasses.

5. The vehicle control device according to claim 1, wherein
the processor further configured to specify a glasses position that is a position of the augmented reality glasses brought into the vehicle, the processor configured to specify the glass position based on the positions of the second feature points corresponding to the first feature points, and
the processor calculates the display position based on the glass position.

* * * * *